United States Patent [19]

Silverman

[11] Patent Number: 4,524,434
[45] Date of Patent: Jun. 18, 1985

[54] METHOD FOR DETERMINING THE AZIMUTH AND LENGTH OF A DEEP VERTICAL FRACTURE IN THE EARTH

[76] Inventor: Daniel Silverman, 5969 S. Birmingham St., Tulsa, Okla. 74105

[21] Appl. No.: 392,146

[22] Filed: Jun. 25, 1982

Related U.S. Application Data

[63] Continuation-in-part of Ser. No. 268,787, Jun. 1, 1981, Pat. No. 4,479,204.

[51] Int. Cl.³ .............................................. G01V 1/24
[52] U.S. Cl. ................................... 367/37; 166/250; 166/254; 367/14
[58] Field of Search .................. 73/37, 154; 181/102, 181/105, 108, 112, 122; 166/249, 250, 254, 308; 367/14, 35–37, 75, 86, 912

Primary Examiner—Sal Cangialosi
Assistant Examiner—K. R. Kaiser

[57] ABSTRACT

In the hydraulic fracturing of deep geologic formations for the production of fluid hydrocarbons, and where vertical fractures are formed, a method is described, using seismic geophysical techniques, for determining the azimuth and length of the fractures. This is accomplished by injecting into the formation through the fracture a selected fluid, or producing the fluid hydrocarbons from the formation into the fracture, until the formation, over a selected distance from the walls of the fracture, has a different gas saturation from the condition in the formation farther from the fracture. This condition is mapped by seismic methods.

19 Claims, 6 Drawing Figures

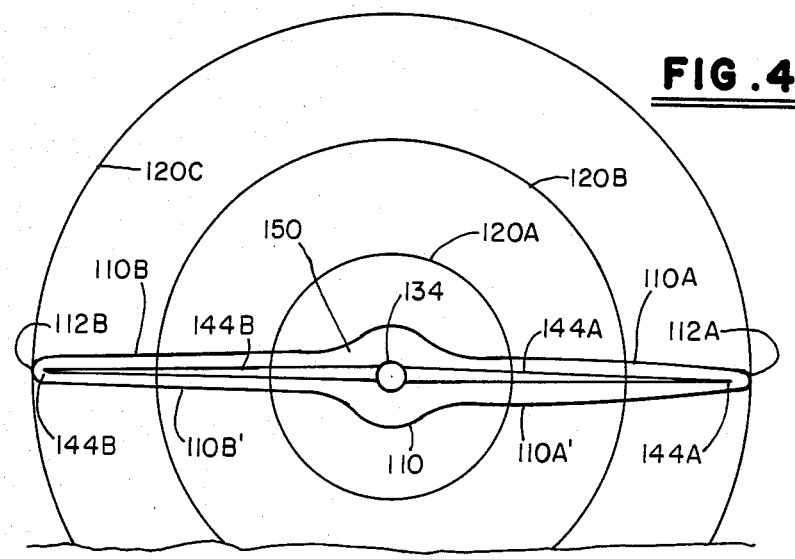
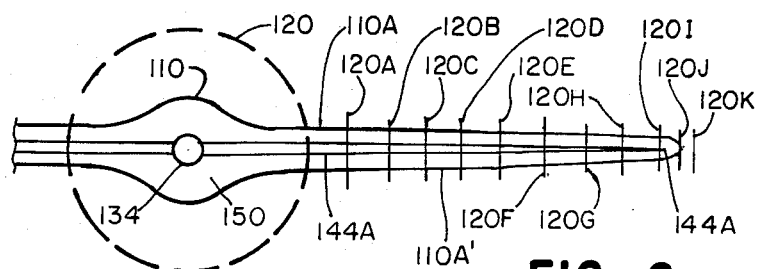
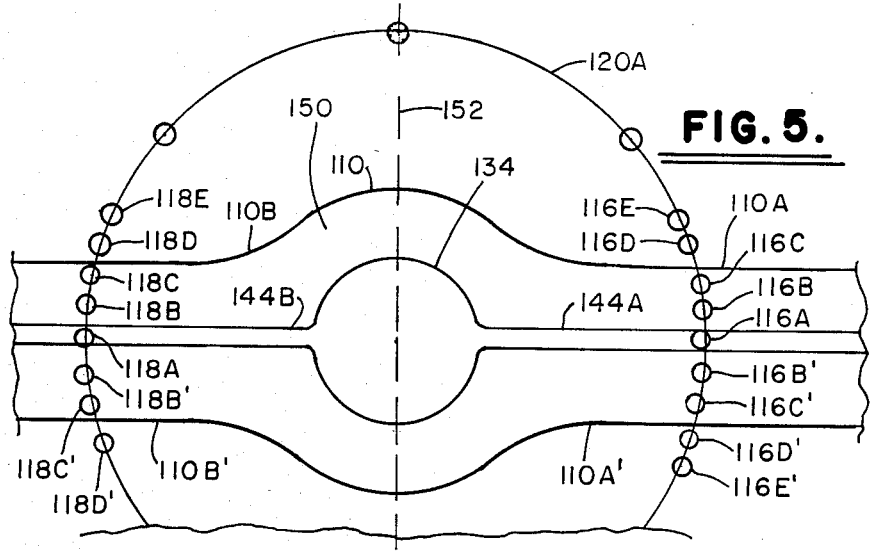

METHOD FOR DETERMINING THE AZIMUTH AND LENGTH OF A DEEP VERTICAL FRACTURE IN THE EARTH

CROSSREFERENCE TO RELATED APPLICATION

This application is a continuation-in-part of my co-pending application, Ser. No. 268,787 filed 6/1/81 entitled: Method of Monitoring the spatial production of hydrocarbons from a petroleum reservoir soon to issue as U.S. Pat. No. 4,479,204. Ser. No. 268,787 is entered by reference into this application.

BACKGROUND OF THE INVENTION

This invention lies in the field of the production of petroleum liquids and gases from deep geologic formations.

More particularly it lies in the field of production of petroleum liquids and gasses from formations of low permeability where the formations must be hydraulically fractured in order to get economic hydrocarbon flow.

Still more particularly it lies in the field of methods and apparatus for determining the azimuth and length of deep vertical fractures in the earth.

Recent work in seismic prospecting has involved improved methods of analyzing field records of reflections received from reflection at the top of certain formations where there is a condition of gas saturated liquids in the pores of the formation. This situation is conventionally known as "bright spot". So far this has only been applied to the recognition of locations in the earth where this condition pre-exists.

My invention in copending application Ser. No. 268,787, involves the step or steps of injecting a selected fluid into a formation to create this condition, where it did not exist before, so as to make visible by seismic waves the presence, in certain locations in the formation, where such "bright spot" conditions had been generated.

My U.S. Pat. Nos. 4,282,587 and 4,280,200 teach the use of these methods in applications involving shallow formations.

The application applies these techniques to the problems of determining azimuths and lengths of deep vertical fractures.

SUMMARY OF THE INVENTION

The principal object of this invention is to determine the length and azimuth of a vertical fracture in a deep geological formation containing liquid and/or gaseous hydrocarbons.

These and other objects are realized, and the limitations of the prior art are overcome in this invention, by positioning a source of seismic waves, which can produce compressional waves, or shear waves, and can be impulsive or vibratory, as is well known in the art, at or near the surface of the earth, at a selected point, over the expected position of the fracture. A plurality of seismic sensors are positioned at or near the surface of the earth in known positions.

The array of sensors may be in any two-dimensional form. It can be in a plurality of angularly spaced radial arrays. It is preferably in the form of a plurality of at least partial circular arrays, at different radial distances from the source, which is preferably positioned near to the borehole through which the formation was fractured, and through which the formation is being produced.

The method involves, after the fracture has been formed, of altering the gas saturation in the producing formation in the vicinity of the fracture walls. As is clearly described in my U.S. Pat. No. 4,282,587 which has been entered into this application by reference, this makes the portion of the formation in which the gas saturation has been altered determinable at the surface, by the use of seismic method.

The shape of the zone in which the gas saturation has been altered will be an elongated zone, the axis of which passes through the well and relates to the azimuth and length of the fracture.

In order to map this zone, sensors will be required at the surface over a circular area of radius greater than the radius or length of the fracture. Thus the reflection points on the top interface of the formation will all be within a circle of slightly greater radius than that of the expected fracture. Those reflection points which are within the altered zone will show anomalous reflections compared to those which are outside of this zone. These anomalous reflections can be detected by the sensors, and the electrical signals from the sensors will provide information as to the azimuth and length of the fracture.

It will be clear, of course, that some time must elapse after the fracture has been formed before the gas saturation can be changed over a substantial area. Thus, the formation is in a substantially static condition. Therefore all of the previously described steps of the process need not be carried out at the same time.

The preferred method would be to set out at least one circular array of closely spaced sensors, at a relatively short radius, so that the reflection points will be at a radius of the order of ¼ or ⅛ of the expected radius of the fracture. Also since the two wings of the fracture are diametrically opposite to each other, not even a full circle of sensors is required to determine the azimuth of the fracture. Thus, if the width of the zone of alteration, at the radius of the array, is less than say 30° for example, then the array need be no longer than 180°+30° or 210°, in length.

When the "zone" is detected by this first short, closein array, it can then be followed out to greater radii by continuing the process. Thus, by this method relatively few sensors are required at one time. Also, the sensors in the short lines of sensors can be closely spaced to mark a more precise limit to the edges of the zone. These short lengths of sensor arrays can be in a line perpendicular to the observed axis of the zone. The best determination of the azimuth of the fracture will be substantially midway between the bounding walls of the zone.

By continuing to move the arrays to greater radius, it will be observed that the width of the zone will narrow, and at a certain value of radius will disappear altogether. This radius would mark a point beyond the end of one wing of the fracture. The other wing of the fracture would be mapped in the same way.

It will be clear also, as the mapping of the fracture progresses to greater radii, that the position of the source can be changed to provide optimum operation over the length of the short linear arrays across the zone.

It will be clear also, that instead of a "circular" array, an array comprising a plurality of short linear arrays tangent to a circle, can be used, and so on.

BRIEF DESCRIPTION OF THE DRAWINGS

These and other objects and advantages, and a better understanding of the principles and details of the invention will be evident from the following description, taken in conjunction with the appended drawings, in which:

FIG. 4 illustrates a plan view of the possible fracture and the altered zone and possible sensor arrays.

FIG. 5 is an enlargement view of a part of FIG. 4, showing more detail.

FIG. 6 illustrates other possible array configurations.

DESCRIPTION OF THE PREFERRED EMBODIMENT

The operation of the method of this invention will be better understood by reviewing briefly the principles of the transmission and reflection of seismic waves at geologic interfaces in the earth.

Figure 1:
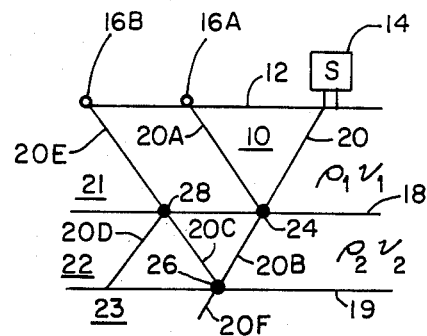
FIG. 1 is a prior art figure representing the transmission and reflection of seismic waves at geologic interfaces.

Referring to FIG. 1, which is fully taught in most textbooks on the seismic process of geophysical prospecting, the earth 10, having a surface 12, is shown having three geologic formations 21 at the surface, 22 below the formation 21, with an intervening contact or interface 18, and a third formation 23 in contact with 22, at an interface 19.

A seismic source 14 is set up at the surface, and a plurality of sensors, such as geophones 16A, 16B, etc., spaced from the source 14. By conventional representation, a ray of seismic energy 20 passes downwardly to reflection point 24 at the interface 18, where generally part of the energy is transmitted across the interface 18 as ray 20B, and part is reflected, as upwardly reflected ray 20A.

Again, at interface 19, part of the energy of ray 20B is transmitted at reflection point 26 across the interface 19 as ray 20F, and part is reflected upwardly as ray 20C.

Part of the upwardly traveling ray 20C at reflection point 28 is transmitted across the interface 18, from below as the ray 20E, and part is reflected downwardly as ray 20D, and so on.

There are several relationships that are well known. First, at the reflection point 24, for example, the angles of incidence and reflection, are equal. This occurs at all reflection points, such as 24, 26, 28, and so on. Second, the division of energy as between the incident wave and the reflected wave is given by the relation $$R = \frac{AR}{AI} = \frac{\rho_2 V_2 - \rho_1 V_1}{\rho_2 V_2 + \rho_1 V_1} \quad (1)$$

where
R is the reflection coefficient, or the ratio between the energy of the reflected wave, to the incident wave.
AR is the energy of the reflected wave.
AI is the energy of the incident wave.
$\rho_1$ is the density of the formation 1 from which the wave is incident.
$\rho_2$ is the density of the formation 2, into which the wave is transmitted.
$V_1$ is the velocity of seismic wave transmission in formation 1.
$V_2$ is the velocity of seismic wave transmission in formation 2.
Of course, the energy of the transmitted wave in formation 2 is given by $$AT = AI - AR.$$

The quantity $\rho V$ is called the acoustic impedance of a selected geologic formation. Such formations in the earth have independent densities and velocities. Thus, two different formations may have the same acoustic impedance, yet be considerably different in $\rho$ and/or V, and vice versa.

The reflection coefficients R are generally small, thus sufficient energy is present in deep reflections, after having been traversing many hundreds or thousands of geologic interfaces, to be detectable.

However, where the reflection takes place between a rock and a liquid, because of the disparity in density and velocity the reflection coefficient can be quite large. Also where the interface is between rock and a gas, such as at the surface of the earth, the reflection coefficient can be almost 100 percent.

Also, there may be considerable change in phase differences between the incident and the reflected waves. So, comparison of the amplitudes and phase changes can be important in defining the reflection.

In equation 1, the seismic velocity is a complex function of a number of rock physical and elastic properties, such as porosity, cementation, type of fluid saturation, density, and compressibility of the fluid, and so on. If the pores are filled with a liquid, such as water, or gas, the velocity is a simpler function than where gas is present in the pores, either alone, or as partial saturation in the liquid or liquids.

Because of the great compressibility of the gas when present in the liquid, it provides a combination fluid of high compressibility. This is the case, even for a small percentage of gas. Thus, as little as 5% saturation, or less, of gas in water or oil, can increase the compressibility to the point where the acoustic impedance of the rock is greatly lowered.

For example, with an unconsolidated sand below a shale (shale is substantially impervious to gas), quite a small saturation of gas (say 5% or less) in oil or water in the pores can increase the reflection coefficient from a low value to a much higher value. Thus such a lithological condition without gas, that might not produce a recognizable reflection, with a small amount of gas, can produce a very large reflection.

In this invention I have made use of these principles in mapping those areas of a hydrocarbon producing formation in which the gas concentration is in a selected zone of the formation has been altered, so as to have a different gas concentration than is present in other parts of this formation outside of this zone. This alteration can be accomplished in either of two ways; (a) by injection of suitable fluids into the formation to bring about this change, or (b) by producing the formation, thus reducing the pressure, and permitting gas to be released from solution, and to form entrained bubbles of gas in the liquid.

This procedure is applied to the problem of determining the azimuth and length of a deep vertical fracture in such a producing formation. Thus, once the fracture is completed, a selected correction fluid of suitable properties can be injected through the borehole into the fracture, and through the walls of the fracture into the formation.

Figure 2:
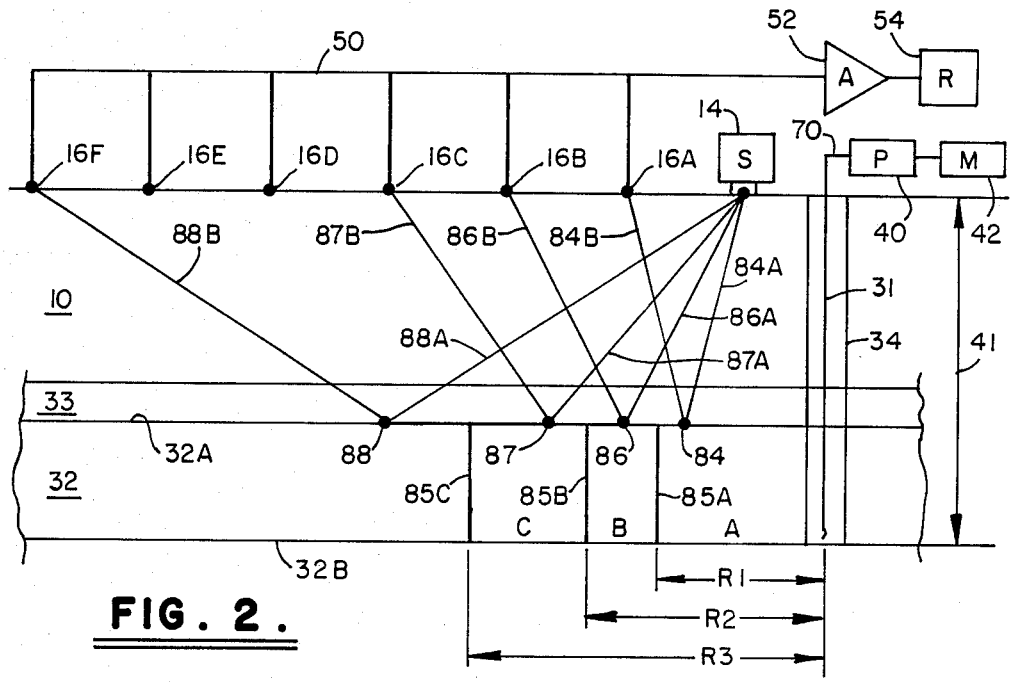
FIG. 2 illustrates schematically one embodiment of this invention.

There will then be a zone of invasion of the correction fluid into the formation, which is the altered zone. In this case a plan view of the fracture and the surrounding formation would look like FIG. 4. The scale of FIG. 4 is distorted to provide greater clarity. The altered zone 150 is the elongated area extending along an axis through the well bore 134 and symmetrical with respect to the fracture 144A, 144B. This area is outlined by the lines 110A, 110A$^1$, 110B$^1$ and 110B. FIG. 2 shows a vertical section taken through the borehole 34 and fracture 144A, 144B.

Referring now to FIG. 2, there is shown schematically one embodiment of this invention, comprising a portion of the earth 10 having . . . the surface supporting the sensors 16A, 16B, etc. There is a borehole 34 drilled in a conventional manner from the surface, as shown by arrow 41, to and into a geological formation 32.

The producing formation 32 is overlain by an impervious rock formation 33, having a mutual interface 32A. The bottom interface of the formation is indicated as 32B. A seismic source 14 generates elastic (seismic) waves that travel down through the earth in the form of rays 84A, 86A, 87A, 88A, and so on, and are partially reflected upwardly, as rays 84B, 86B, 87B, 88B and so on, where they are detected by sensors 16A, 16B, 16C, 16F respectively, and so on.

The electrical signals generated by the sensors 16 are passed by cable 50 to amplifier 52, recorder 54, and so on, all of which are conventional seismic acquisition instruments, and need not be described further. The array of sensors 16 is shown, for purposes of illustration only, and not by way of limitation, as a radial array, in a vertical plane through the fracture 144.

Assume, for example, as in FIG. 4, that an area 150 (FIG. 4) has been formed in which the gas saturation has been altered to be higher in the zone 150 then it is outside of the zone 150. Then the electrical signals from sensors, that receive seismic rays reflected from points inside the zone 150, such as 16A, 16B, 16C, will have different character than those sensors for which the reflection point is outside of the zone, such as 16F, for example, which is at a greater distance than the end of the fracture 144B, and those which are laterally spaced outside the zone 150.

If the number of sensors is sufficient to clearly delineate the boundaries 110A, 110A$^1$, 110B$^1$, then the azimuth of the fracture would be substantially co-axial with the walls 110A and 110A$^1$, as well as 110B and 110B$^1$. Furthermore, the length of the fracture arms will be of the order of the distances out to points 112A and 112B.

Where the seismic source puts out a relatively simple wavelet, the "character" of the reflected seismic wave can be fairly simple. On the other hand, when the incident seismic wave is a long time function, as from a vibratory source, the "character" of the reflected wave can be very complex.

Also, where the seismic waves are shear waves which do not transmit through a liquid or gas, the reflected energy can be very large.

Thus, by making use of these principles and with the appropriate geometry and observing the character of the seismic waves and functions of their amplitude and phase, much information can be determined relating to the dimensions of the zone 150.

Figure 3:
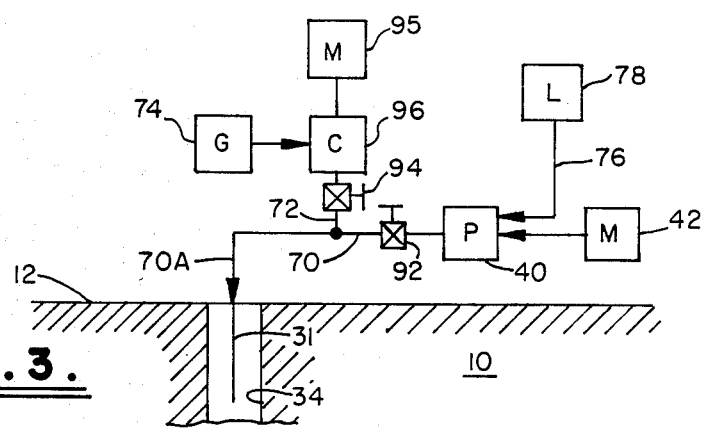
FIG. 3 illustrates to a larger scale and greater detail, part of FIG. 2.

In FIG. 2 and in FIG. 3, to a larger scale with more detail, I show an apparatus for injecting pressurized liquid and/or pressurized gas into the formation.

A source of oil or other liquid L,78 goes to pump 40, driven by motor 42. The output of the pump 40 goes through valve 92 and pipes 70 and 70A to the injection well 34 and through pipe 31 to the formation. There is a supply of selected gas G,74 that goes to a compressor 96 that is driven by motor 95. The output of compressor 96 goes through valve 94 and line 72 to line 70A to the well. By adjusting pressures of liquid and gas, and valves 92, 94, any desired ratio of gas to liquid can be produced, for injection into the formation.

The program described for determining azimuth and length of a fracture must be done after the fracture is formed, and is concerned with vertical fractures. Since the fracture is vertical, or nearly so, there is very little lateral area of the fracture from which a vertical reflection can be formed.

What I propose is, by one means or another, to alter the gas saturation in a liquid in the formation, in the vicinity of the fracture, over a selected zone. I can do this by *adding fluid to* the formation, through the fracture, or *subtracting fluid from* the formation through the fracture.

If the formation contains a liquid without gas, then I would add gas to the formation. If the formation contains gas alone, I would add a liquid. If the formation contained a gas saturated oil, then I would produce oil through the fracture, thus lowering the formation pressure in the vicinity of the fracture. This lower pressure would permit gas to be released from solution in the oil, and to form droplets of gas in the oil, which is the condition for detectability of the gas saturation by seismic methods.

This evaluation of gas from a saturated oil at high pressure is an ideal condition, since the lowering of pressure is transmitted rapidly through the pores from the fracture walls back into the formation. As the pressure drops, gas is released, which pushes out oil, etc.

The basic explanation of this process is to consider a virgin formation, having an original gas saturation, preferably that would be very low. The well is then fractured, and the requirement for making the fracture "visible" by the seismic method calls for "doing something" to make the gas saturation different. If it happens (as described above) that just producing from the formation will change the gas saturation, then all the better. So, after a selected first period of production the sensors and source are laid out and the reflections recorded.

If there is no seismic evidence of the zone of invasion, this could mean any one of three things is possible:

(a) the signal to noise ratio of the received electrical signals is too poor. If so, the well known means for enhancing signal to noise ratio can be tried; such as stacking, or using more closely spaced senosrs, repetition of the source, etc.

(b) the progress of the growth of the altered zone is too slow, and the size of the zone is too small to be detected. In this case the well should be produced for a second period of time and the source operations repeated, etc.

(c) if the best efforts to lay out the sensor array and repetitions, etc., and the longer production time fail to provide an altered zone then, it would mean that the proper initial conditions were not present. Then, based on the knowledge of the formation fluid being produced, a program of injection of fluid can be set up. In any case, any operation on the fluid in the formation that was made subsequent to the fracturing of the formation, whether it was done for this purpose of this invention or not, must be counted as a step in the performance of the method of this invention.

While the geophysical measurements with sources and receivers can be carried out in many ways, as described in connection with FIG. 2, there are some preferred designs of arrays and sources.

The method is applicable after the fracture has been created. From the design basis for the fracture there may be some estimate of the length of the fracture, which will be, say L from the well to either end, or 2L from one end to the other end. Therefore, if there is no basis for estimating the azimuth to be in one direction or another, then a circle of diameters 2L must be seismically investigated.

However, a preferred way to determine the azimuth would to choose a circular array of sensors relatively close in to the well. Considering that the invaded or changed zone lies within the circle 110 and lines 110B and 110A of FIG. 5, at a point where each of these lengths would be relatively equal, a circular array of geophones or other sensors 116A, 116B, 116C, 116D, etc., are laid out. The source of positions, and the responses of the sensors, that is, the electrical amplified signals, should be compared for differences in amplitudes, phases, and other parameters, and so on.

If the comparison of the sensor signals indicate differences, such as would indicate the presence of different gas saturations, within and without the invaded or changed zone 150, then at least a rough estimate of the azimuth of the fracture can be determined.

If such a rough estimate of the azimuth has been obtained, the next step in the mapping of azimuth and length, would be to move out to greater distances from the well, and lay out short arcuate or tangent arrays of sufficient length to ensure covering the altered zone. The density of sensors should, if possible, be increased in those short arrays so as to better define the limits of the altered zone.

Since the pattern of alteration is at best a slowly changing one, the survey of the whole possible 2L length of the fracture can be done in successive short arrays. This is shown in FIG. 6, where the circle 120 would be the locus of possible reflection points at the depth of the fracture. The successive lines 120A, 120B, 120C . . . 120I, 120J, 120K, would be carried out to define the outer limits or length of the fracture.

Since these lines are locii of reflection points, the actual sensor positions will be different, depending on the locations of the source or sources. All this geometry of sources and sensors is well known in the art and need not be described further.

It should be remembered, that, in general, the altered or invaded region (inside the boundaries 110A, 110A$^1$, and 110B, 110B$^1$) should by symmetrical with respect to the fracture. Thus once the lines 110A, 110A$^1$, 110B, 110B$^1$ are determined, the fracture plane can be drawn and the fracture azimuth determined.

I have shown the spacings between the reflection locii lines smaller as the ends of the fracture are reached. In this region the spacing between boundaries changes rapidly, and can end abruptly. Thus the end of the fracture is between the lines 120J and 120K.

It will be clear that in wells that have been drilled and fractured in the recent past may show clearly the azimuths and lengths of the fractures, depending on the type of fluid originally in the formation.

Also, it will be clear, that even if an old well had not been fractured, depending on the original fluid in the formation, this type of a survey could provide a useful picture of the drainage pattern about each well, and provide some estimate of the amount of oil still in place, depending on the drilling pattern.

It will be clear, of course, that in a gas producing formation, if the original fluid was above the cirtical pressure for the gas, then on fracturing, with the reduction in pressure, there would be gas evolving in the vicinity of the fracture and this would be detectable by this invention.

It will be clear, of course, that where there is prior knowledge of the possible azimuth of the fracture, the arrays such as 120A, 120B, etc. of FIG. 6 could be utilized right from the start. Of course, where the azimuth of the fracture is entirely unknown, the circular array 120 of FIG. 6, or the array of FIG. 5 must be used. The arrays of FIG. 5 can be further simplified by using only half of the circle 120A, say 200° of arc. This is sufficient since the zone 150 is symmetrical about the dashed line 152.

While I have discussed steps of fracturing a well, and steps of positioning sources and sensors on the surface, it will be clear that whether the sources and senors are positoned before or after the fracturing is irrelevant and they can be carried out in any desired order.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a mineral recovery program in a selected geological formation in the earth in which said mineral in said formation is a first fluid, and in which a vertical hydraulic fracture has been created in said geological formation, by the injection of a selected pressurized second fluid through a borehole from the surface to said formation, the method of determining the azimuth and length of said fracture, after said fracture is formed, comprising the steps of:
   (a) providing at least a first selected source of seismic waves at or near the surface of the earth, at at least one point in the vicinity of the mouth of said borehole;
   (b) positioning at or near the surface of the earth an array of a plurality of seismic sensors at selected known positions, said sensors adapted to receive the upward reflection of downwardly directed seismic waves generated by said first source, and to convert them to electrical signals;
   (c) after said fracture has been formed, selecting a third selected fluid such that when it is injected into said formation through said borehole and said fracture, there will be two zones, a first zone near to said fracture, having at least a different partial saturation of gas in liquid different from the fluid in the second zone farther from said fracture, which liquid was present before said injection of said third fluid;

(d) injecting said third selected fluid into said formation through said borehole and said fracture for a first selected period of time;

(e) operating said first seismic source a first time and comparing the first electrical signals from each of at least two sensors;

whereby if the two electrical signals are different, the reflections will be from different zones, the first of which has been invaded by said third fluid; and (f) making comparisons between many signals from many sensors to determine the shape, size and orientation of said first zone, which will be symmetrical with respect to said fracture.

2. The method as in claim 1 including the steps of injecting said third selected fluid for a second selected period of time, and repeating step (e).

3. The method as in claim 2 including the additional step of: comparing said first and second electrical signals from at least one of said sensors.

4. The method as in claim 3 including, repeating the steps of claim 3 until there is a difference in the first and second signals from at least one of said sensors.

5. The method as in claim 4, including the step of determining the coordinates of the first reflection point of the seismic wave to said at least one of said sensors; and determining the azimuth of a line from said borehole to said first reflection point.

6. In a mineral recovery program in a selected geological formation in the earth, in which said mineral is a first fluid, and said formation has been hydraulically fractured through a borehole leading to said formation from the surface, and this existing fracture is a deep, near-vertical fracture; the improved method of determining the azimuth and length of said fracture, comprising;

(a) providing at least a first selected source of seismic waves at or near the surface of the earth at at least one point in the vicinity of the mouth of said borehole at the surface of the earth;

(b) positioning at or near the surface of the earth an array of a plurality of seismic sensors, at selected known horizontal positions, said sensors adapted to receive the upward reflection of downwardly directed seismic waves generated by said source, and to convert them to electrical signals;

(c) determining the nature of said first fluid in the pores of said selected formation;

(d) selecting a second fluid which differs in gas saturation from said first fluid;

(e) injecting, for a first selected time period, said second selected fluid into said formation through said borehole and through the walls of said fracture;

whereby said second fluid will flow into said formation from said borehole and fracture, and the area in said formation into which said second fluid has flowed will be in the shape of a first elongated zone or area, the axis of which will be co-directional with the azimuth of said fracture;

(f) operating said seismic source a first time and comparing the first electrical signals from each of said plurality of sensors;

whereby if the electrical signals from reflection points in the first zone are different, then the first zone will have been invaded by said second fluid, and said first zone will be symmetrical with respect to said fracture.

7. The method as in claim 6 including the additional steps of;

(a) continuing said injection of said second fluid for a second selected period of time and repeating step (f) to provide second signals from each of said plurality of sensors; and (b) comparing said second signals from each of said sensors.

8. The method as in claim 7 including the additional steps of;

(a) comparing said first and second signals from each of said sensors.

(b) noting differences in first and second signals;

(c) determining the reflection points of said sensors which show different signals;

(d) plotting said reflection points to outline a second elongated area, which includes the reflection points of all said different signals; and (e) determining the azimuth, with respect to the borehole, of the axis of said second elongated area.

9. In a mineral recovery program in a selected geological formation in the earth, in which said mineral is a first fluid, and said formation has been hydraulically fractured through a borehole leading from the surface to said formation; and the existing fracture is a deep, near vertical fracture; and in which said first fluid is a pressurized hydrocarbon liquid or oil containing dissolved hydrocarbon gas; the improved method of determining the azimuth and length of said fracture, comprising the steps of;

(a) providing at least a first selected source of seismic waves at or near the surface of the earth at at least one point in the vicinity of the mouth of said borehole;

(b) positioning at or near the surface of the earth an array of a plurality of seismic sensors, at selected known horizontal positions, said sensors adapted to receive the upward reflection of downwardly directed seismic waves generated by said source, and to convert them to electrical signals;

(c) after said fracture is formed, producing said hydrocarbon liquid for a selected first period of time through said fracture, (d) operating said seismic source and comparing the electrical signals from each of said plurality of sensors;

whereby as said first fluid is produced and the pressure in said formation is reduced, gas will come out of solution in the oil and in a first zone near to said fracture the gas saturation in the rock pores will increase and the presence of the altered condition in said first zone will be shown by the electrical signals from reflection points in said first zone.

10. The method as in claim 9, including the additional steps of:

(a) producing said first liquid from said formation through said fracture for a second selected time period; and (b) operating said source a second time and comparing the second electrical signals from each of said plurality of sensors.

11. The method as in claim 10 and including the steps of comparing the first and second signals from each of said sensors.

12. The method as in claim 9 and including the additional steps after said fracture has been formed and said first liquid produced for a selected period, and said source has been operated and electrical signals have been produced by said sensors;

(a) comparing said electrical signals;

(b) determining the reflection points of the seismic waves to said sensors which show different signals;

(c) plotting said reflection points to outline an elongated area, which includes the reflection points of all said different signals; and (d) determining the azimuth, with respect to the borehole, of the axis of said elongated area.

13. The method as in claim 12 and including the additional step of determining the length of said fracture.

14. The method as in claim 13 in which the step of determining the length of said fracture comprises the steps of;

(a) positioning a plurality of short spaced lines of sensors substantially perpendicular to the plane of the fracture, and operating said sources to produce electrical signals from said sensor, and determining the width of the altered zone at the reflecting points corresponding to each sensor; and (b) identifying the reflecting points farthest from the well bore which show the presence of the altered zone, and determining the length of the fracture.

15. The method as in claim 12, and including the additional steps after the azimuth of the fracture has been determined, of;

(a) setting out a plurality of short lines of sensors substantially perpendicular to said azimuth, each line of selected length and spaced from its neighbors by selected distances;

(b) operating said source, and comparing the electrical signals; and (c) determining the radius from the borehole to the farthest sensors which show the altered character of electrical signals.

16. The method as in claim 9 in which said array of sensors comprises;

(a) a circular array of sensors having a radius R from the borehole; which R is equal to KL, where L is the expected length of the fracture, and K is a fraction less than one.

17. The method as in claim 16 in which K is in the range of 0.1L to 0.2L.

18. The method as in claim 16 in which K is in the range of 0.1L to 0.4L.

19. The method as in claim 16 in which said signals show changes over a portion of said array, and including the step of;

(a) repeating said source with said array a circular arc of the same azimuth but with the second radius greater than said first radius.

* * * * *